May 18, 1926.

H. G. JORGENSEN

PENCIL HOLDER

Filed July 10, 1923

1,584,776

Inventor
Hans G. Jorgensen
Attorney

Patented May 18, 1926.

1,584,776

UNITED STATES PATENT OFFICE.

HANS G. JORGENSEN, OF ERIE, PENNSYLVANIA.

PENCIL HOLDER.

Application filed July 10, 1923. Serial No. 650,731.

This invention is designed to form a convenient receptacle for pencils which may, if desired, be carried in the ordinary pocket.

The invention is illustrated in the accompanying drawings as follows:—

Figure 1:
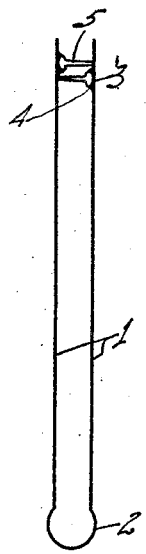

Fig. 1 shows a side elevation.

Figure 2:
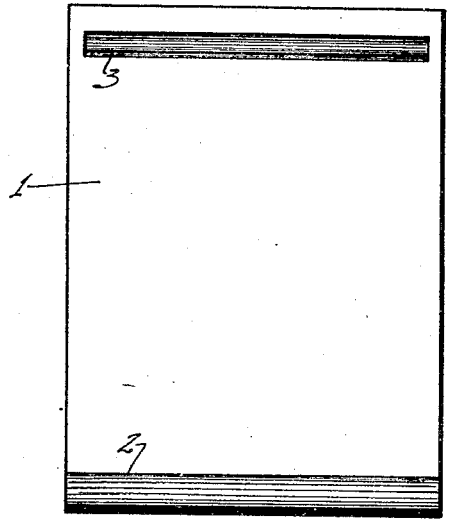

Fig. 2 a front elevation.

Figure 3:
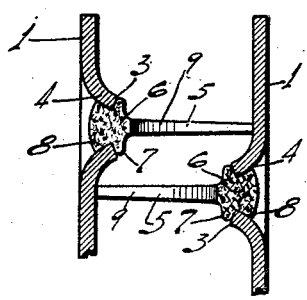

Fig. 3 an enlarged cross vertical section of the holding flaps.

Figure 4:
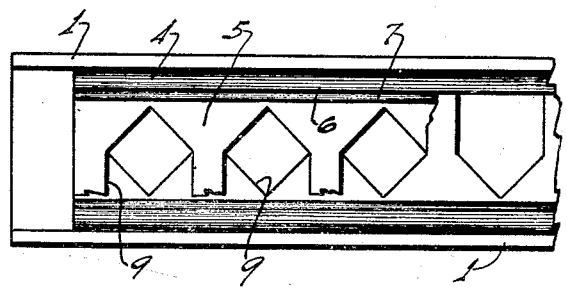

Fig. 4 an enlarged plan view of the device.

The frame of the holder is formed of a plate 1 of U-shape, the plate being preferably of spring metal making a spring bend at 2. Slots 3 are formed in the side walls of the plate and the plate is bent inwardly at 4 adjacent to the edges of the slots.

Pencil holding flaps 5 of rubber extend transversely across the space between the walls of the clip or plate 1. These flaps have the bases 6 with ribs 7 engaging the inner edges of the walls of the slots 3 and an enlarged rib 8 which engages the outer surfaces of the bent portions 4.

The base is flexible enough so that the ribs 7 may be readily forced through the slots 3 but are sufficiently rigid to hold the flaps in position in ordinary use. The bent-in portion makes a housing for the rib 8 so that the rubber does not extend outwardly from the face of the plate.

The flaps 5 are notched at 9, the bottoms of the notches being rounded and the overlapping flaps complete a circle of a size that will yieldingly engage the pencil or pen and will yieldingly hold the same.

What I claim as new is:—

1. A pencil holder comprising a frame having opposing walls and overlapping flaps of rubber, each flap extending entirely across the frame mounted on said walls and adapted to receive by flexure a pencil between them.

2. A pencil holder comprising a frame having opposing walls and notched and overlapping flaps of rubber, each flap extending entirely across the frame mounted on said walls and adapted to receive by flexure a pencil between them.

3. A pencil holder comprising a frame in the form of a U-shaped plate having slots therein and opposing flaps of rubber having bases engaging the edges of the slots for securing the flaps to the walls, said flaps of rubber being adapted to receive by flexure a pencil between them.

4. A pencil holder comprising a frame in the form of a U-shaped plate, the walls having slots and inwardly deflecting portions adjacent to the slots forming an undercut groove in the wall of the plates and opposing flaps of rubber having bases with engaging ribs engaging the edges of the slots, the deflected portion housing the outer part of the base.

In testimony whereof I have hereunto set my hand.

HANS G. JORGENSEN.